Patented Feb. 13, 1940

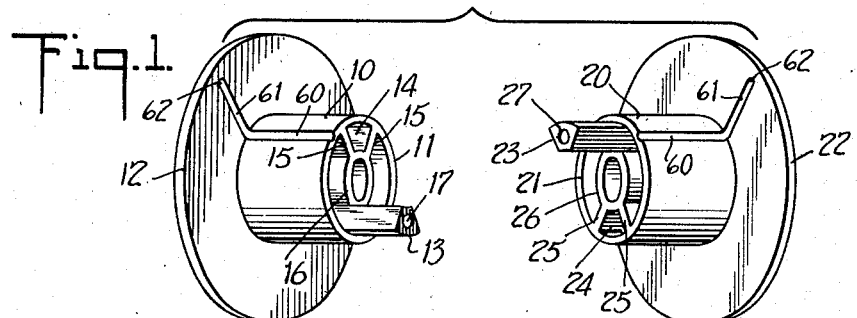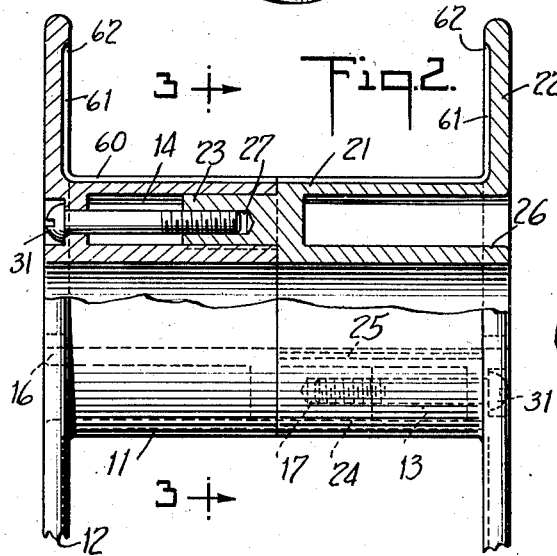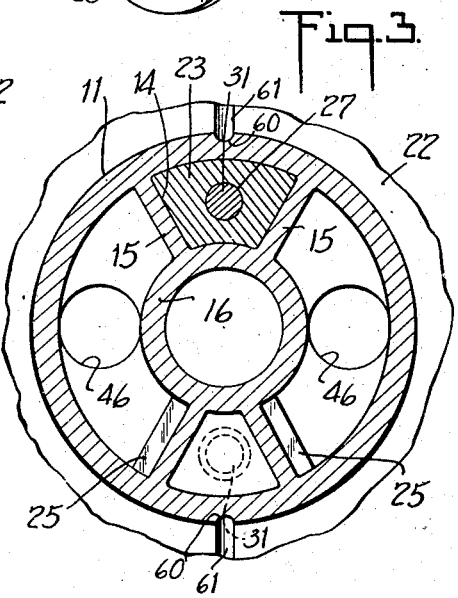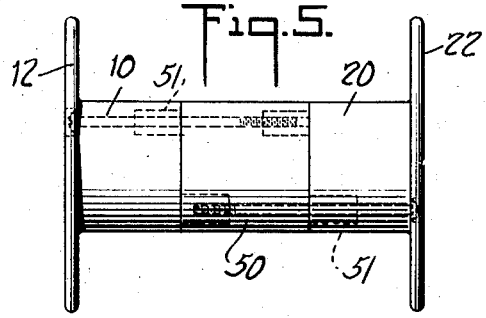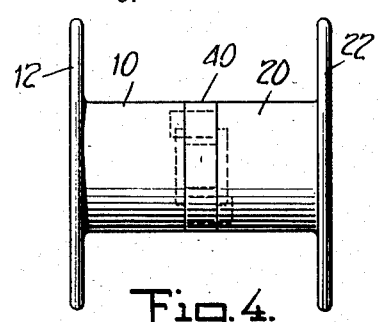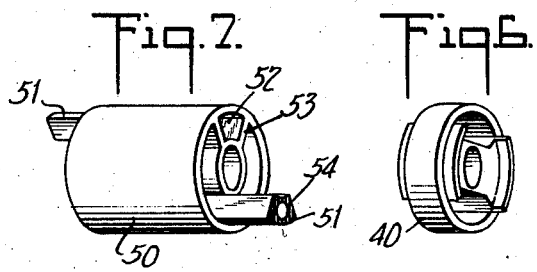

2,190,013

UNITED STATES PATENT OFFICE 2,190,013

SPOOL

Harry Mancel Byers, Fort Wayne, Ind., assignor to Phelps Dodge Copper Products Corporation, New York, N. Y., a corporation of Delaware Application March 24, 1939, Serial No. 263,860

4 Claims. (Cl. 242—118)

My invention relates to spools, more particularly to spools upon which very fine wire may be wound for convenience in storing, shipping and handling, and has for its object the production of an assembled die cast spool that will be economical in manufacture, easy to assemble and one having a structure that will overcome the many disadvantages inherent in the spools now on the market.

Heretofore spools of a similar character have been made with two flanges or heads fitted to the ends of a tubular member or drum. Such spools have a great disadvantage in that the fine wire to be wound thereon has a tendency to find its way into the joint, no matter how carefully made, between the head of the spool and the barrel and jamb in which case the wire does not readily reel off the spool and much of the spool contents is ruined. This disadvantage has been overcome by die casting the spools in a single piece. While the disadvantage of the wires being drawn between the head of the spool and the barrel has been eliminated, other and more serious disadvantages presented themselves. A single piece die cast spool presents a difficult job in any attempt to straighten a bent head and when one head is badly damaged it means that the entire spool has to be discarded. Then too, a single piece spool requires considerable spool inventory to take care of the commercial demand for different traverse spools, the barrels varying in length by a quarter inch.

I have overcome these difficulties and disadvantages in the present designs by making an assembled die cast spool in two identical halves. Each half will be equipped with an extending guide that will fit into an aperture of the corresponding half in such a manner to insure a perfect alignment. The spool may be held together by bolts or any other convenient way. To vary the traverse, a washer could be added between the halves and any reasonable traverse length could be obtained at the small additional cost of the washer. My spool may be driven by means of a driver pin in the spool head, thus eliminating the old practice of a spring in the spool holder which has had a tendency of throwing a spool off center and wearing the tube hole oversize.

The foregoing and other features of my invention will now be described in connection with the accompanying drawing forming part of this specification in which I have represented a preferred embodiment of my invention, after which I shall point out in the claims those features which I believe to be new and of my own invention.

In the drawing:

Figure 1 is an isometric view of two identical halves of my die cast spool, separated to show their relative positions.

Figure 2 is a longitudinal cross section of my spool.

Figure 3 is a cross section along the line 3—3, Figure 2, scale a trifle larger.

Figure 4 is a side view of my assembled spool with a washer inserted between the sections to lengthen the traverse of the spool.

Figure 5 is a side view similar to that shown in Figure 4 where the length of the traverse requires a mid-section.

Figure 6 is an isometric view of the washer employed.

Figure 7 is an isometric view of the mid-section employed.

In the carrying out of my invention I intend to use two identical sections 10 and 20 as illustrated in Figure 1. The sections have identical cylindrical portions 11 and 21 which when assembled will be the drum of the spool. On the end of the cylindrical portion 11 I provide a flange 12 cast integral therewith. On the opposite end I provide an extension or guide 13 of such cross-section to permit it to snugly fit in the recess 24 of the member 20. I also provide a recess 14 within the cylindrical portion 11 to receive the guide 23 of the member 20.

While these guides and recesses may be any shape, the structural features of my spool suggest that the guides should be substantially sector shape to correspond with the space between the radial members of the drum. In the manufacture of my device I have lightened the casting by making the cylindrical portion thin and supporting it by radial members 15 and 25 from a central hub member 16 and 26 respectively. The projection or guides 13 and 23 are drilled and tapped to receive screws 31 which project through the heads 12 and/or 22 and screw into the tapered holes 27 and 17 respectively.

In commercial use a larger variety of spools are used with a multiplicity of different lengths of drum. With my construction I intend to meet this demand, without the necessity of larger inventory and the great cost of dies incident thereto where the spools are cast in a single piece, by lengthening the traverse by inserting special length washers 40 as shown in Figure 4. Where the traverse required exceeds the capacity of my guides, I may make a special mid-section 50 that will have on each end extensions or guides 51 and recesses 52 between the radial ribs 53, and the holes 54 so that screws may be inserted as before to hold the parts together, as shown in the assembly illustrated in Figure 7.

The alignment of the barrel is insured by reason of the construction and a perfect reel or spool is provided with a long traverse.

I may employ one or more longitudinal slots 60 cut in the barrel of my spool, the slots extending into the heads as at 61 and terminating within the drum head as at 62. The object of these slots is to provide a convenient means to cut off small amounts of wire which may be left on the spool without scoring the drum. These slots 61 should stop about ¼" from the outside of the flange, in order to prevent any interference in taking the wire off the head of the spool when unreeling.

This construction presents a spool that is easy to maintain at all times, whereas with the case of a solid die cast spool, when a head becomes damaged it is necessary to scrap the entire spool. With this construction the two halves may be taken apart and the head straightened and reassembled. Perchance one half is damaged beyond repair a new half can replace the broken half, at half the cost of a new spool.

I provide holes 46 extending through the assembled spool which are used to accommodate a driver pin in the spool head thus eliminating the old practice of spring in spool holders, which have a tendency of throwing a spool off center and wearing tube hole oversize.

I wish it distinctly understood that my spool herein illustrated and described is in the form in which I desire to use it and that changes or variations may be made as may be convenient or desirable without departing from the salient features of my invention and I therefore intend the following claims to cover such modifications as naturally fall within the lines of invention.

I claim:

1. A spool of the class described comprising in combination two identical members, each having a cylindrical barrel member, a cylindrical core member, a plurality of radial members connecting the barrel to the core, a flange on one end of the barrel member and a lug on the other end, said lug having a cross section to snugly fit in the recess between the radial members and extending from the barrel down to the core, the lug on one of the members being fitted in the recess between the radial members of the other member.

2. The device of claim 1 with the addition of means for holding the two halves together.

3. The device of claim 1 with the addition of two drive pin holes extending through the flanges forming with the space between the radial members an opening passing entirely through the cylindrical member excentric the core members.

4. The device of claim 1 with the addition that each member is provided with a groove formed longitudinally within the surface of the cylindrical member and extending radially into the inside face of the flange and terminating within the flange.

HARRY MANCEL BYERS.